(12) United States Patent
Tsai et al.

(10) Patent No.: US 6,718,400 B1
(45) Date of Patent: Apr. 6, 2004

(54) DATA ACCESSING SYSTEM WITH AN ACCESS REQUEST PIPELINE AND ACCESS METHOD THEREOF

(75) Inventors: Chau-Chad Tsai, Taipei (TW); Chen-Ping Yang, Taipei (TW); Chi-Che Tsai, Kaohsiung Hsien (TW)

(73) Assignee: Via Technologies, Inc., Taipei Hsien (TW)

( * ) Notice: Subject to any disclaimer, the term of this patent is extended or adjusted under 35 U.S.C. 154(b) by 480 days.

(21) Appl. No.: 09/715,472

(22) Filed: Nov. 17, 2000

(30) Foreign Application Priority Data

Nov. 26, 1999 (TW) .......................... 88120701 A

(51) Int. Cl.⁷ .......................... G06F 3/00; G06F 12/00
(52) U.S. Cl. .............. 710/5; 710/29; 710/52; 711/146
(58) Field of Search .................. 710/5, 29, 36, 710/52, 58; 711/100, 146, 140, 167, 169, 141

(56) References Cited

U.S. PATENT DOCUMENTS

| | | | | |
|---|---|---|---|---|
| 4,627,018 A | * | 12/1986 | Trost et al. .................. 711/149 |
| 5,712,991 A | * | 1/1998 | Wichman et al. .............. 710/52 |
| 5,802,569 A | * | 9/1998 | Genduso et al. ............. 711/137 |
| 5,845,101 A | * | 12/1998 | Johnson et al. .............. 712/207 |
| 5,850,530 A | * | 12/1998 | Chen et al. .................. 710/113 |
| 6,026,451 A | * | 2/2000 | Sreenivas ..................... 710/39 |
| 6,366,984 B1 | * | 4/2002 | Carmean et al. .............. 710/52 |
| 6,381,678 B2 | * | 4/2002 | Fu et al. ..................... 711/137 |
| 6,499,085 B2 | * | 12/2002 | Bogin et al. ................. 711/118 |

* cited by examiner

Primary Examiner—Kim Huynh
(74) Attorney, Agent, or Firm—J.C. Patents

(57) ABSTRACT

A PCI data accessing system with a read request pipeline and an application method thereof are provided. The PCI data accessing system has a PCI master device, a memory module, and a PCI control device. The PCI master device issues a first read request, and the PCI control device converts the first read request to a second read request divided into a first part and a second part. Each part of the second request requests one line data, i.e. 64 bits data. The memory module stores data requested by the PCI master device. Moreover, there is no latency time between data for the first part and the second part returned from the memory module.

10 Claims, 4 Drawing Sheets

DATA ACCESSING SYSTEM WITH AN ACCESS REQUEST PIPELINE AND ACCESS METHOD THEREOF

CROSS-REFERENCE TO RELATED APPLICATION

This application claims the priority benefit of Taiwan application serial no. 88120701, filed Nov. 26, 1999.

BACKGROUND OF THE INVENTION

1. Field of the Invention

The invention relates in general to a data accessing system and an method thereof, and more particularly to a data accessing system with an access request pipeline and an access method thereof.

2. Description of the Related Art

In a conventional PCI system, there is a process known as Snoop which checks whether the CPU cache contains data needed by a PCI device through a PCI controller device as the PCI device has to fetch the data from the memory. When the CPU cache contains the data, the data are fetched by the PCI controller device from the CPU cache and provided to the PCI device. When the CPU cache does not contain the data, the data are fetched by the PCI controller device from the memory and provided to the PCI device.

No matter what the data source is, the PCI controller device does not send out a request signal for requesting the next data until the previous data are returned back. That is, when the PCI devices request data continuously, or even at the same time, the PCI controller device must send out the request signal for the first PCI device and fetch a first data corresponding to this request signal. Another procedure is proceeded by the PCI controller device for a second PCI device after the first data is returned to the first PCI device. The PCI controller device then satisfies the read requests from all of the PCI devices one by one with the procedure described above.

Reference is made to FIG. 1, which is a timing chart showing a procedure of a computer system while read requests are processed by using prior art. In FIG. 1, the signal PMADS is asserted to a high level when a PCI master device issues a request. The signal PMRDY is asserted to a high level when the PCI master device is ready to access data. The starting addresses and data are put on the AD signal. The FRAME signal is asserted to a low level to indicate beginning of a transaction, and is deasserted to a high level in 1 clock cycle before the end of transaction. The signal IRDY is asserted to a low level by an initiator (for example, the PCI master device) to indicate that the initiator is ready to accept data. The signal TRDY is asserted to a low level by a target device (for example, the memory module) to indicate that the target device is ready to transmit data. The signal DEVSEL selects a device to be the target device in this transaction. During cycle CLK 4, a read request is issued by the PCI master device, that is, the first pulse on the signal PMADS. The first pulse on the data line AD includes starting addresses of data requested by the PCI master device. At the same time, the level of the signal line FRAME is asserted to indicate that the transaction begins. Thereafter, a signal on a data line PMADS is issued during cycle CLK 5. The level of the signal line PMRDY is asserted during cycle CLK 12 to indicate that the requested data have begun to be transmitted to it. The level of a signal line TRDY is asserted to indicate that the target device is ready to transmit the requested data. Therefore, the PCI master device begins to fetch the requested data from the buffer in the PCI controller device during cycle CLK 13.

Thereafter, the level of the signal line PMRDY is deasserted during cycle CLK 16 to indicate that the transmission of the requested data to the buffer is end, and the requested data are now saved in the buffer. The level of the signal line TRDY is deasserted during cycle CLK 17 to indicate that the target device is not ready to transmit data. For a signal line FRAME being kept in a low level, it means that the PCI master device requests more data. Because of this, another read request is issued during cycle CLK 17. The read request is proceeded in the same procedure as described above, and more requested data are transmitted to the buffer during cycle CLK 24. Thereafter, the PCI master device begins to fetch the requested data from the buffer during cycle CLK 25. When the level of the signal line FRAME is deasserted during cycle CLK 28, it indicates that the data requirement of the PCI master device is fulfilled and the current reading process is finished as well.

From the above discussion, it is understood that there are actually some drawbacks within the PCI data reading operation in the prior art. One of the drawbacks in the prior art is that another read request cannot be issued until all of the previously requested data are transmitted to the buffer of the PCI controller device. As shown in FIG. 1, because the level of the signal line PMRDY is deasserted to indicate that the transaction of the previously requested data is completed during cycle CLK 16, the next read request can be issued by way of the data line PMADS during cycle CLK 17. Therefore, for processing any read request of the PCI master device, there is a latency time in the prior art mentioned above. In FIG. 1, the latency time exists between the cycle CLK 5 and the cycle CLK 12 or exists between the cycle CLK 17 and the cycle CLK 24.

The drawback of the latency time in reading operation results in a low efficiency in the PCI system. Moreover, when the drawback of the limitation of data amount in any reading operation is further considered, the negative effect in efficiency is more serious.

Accordingly, there are at least two drawbacks in the prior art as listed below:

1. The limitation of data transmitted in each reading operation results in dividing the read request of the PCI master device into parts; that is, only after some reading operations can the PCI master device obtain all the data.
2. When processing any read request from the PCI master device, there is a latency time when using the prior art.

SUMMARY OF THE INVENTION

The present invention provides a PCI data reading system with read request pipeline, which is adapted to a computer system including a PCI master device, a PCI control device, and a memory module. The PCI master device issues a first read request, and the PCI control device converts the first read request to a second read request divided into a first part and a second part. Each part of the second request requests one line data, i.e 64 bits data. The memory module stores data requested by the PCI master device. Moreover, there is no latency time between data for the first part and the second part returned from the memory module. In one embodiment of the present invention, the PCI control device further includes a read request buffer and a data buffer. The read request buffer stores the second read request, and the second read request is transmitted by the PCI control device with the read request pipeline. The data buffer includes a plurality of data fields, wherein one of the data fields is designated to the PCI master device when the first read request is issued. When data are sent back from the memory module, they are stored in the designated data field.

The present invention also provides a method of using a PCI data accessing system with request pipeline, which is adapted to a computer system including a PCI master device and a PCI control device. The method converts a first request of the PCI master device into a second request including the first request. Then, the present invention stores the second read request. Thereafter, the second request is issued with a pipeline. Finally, data corresponding to the second request is returned and stored. Data are transmitted to the PCI master device while the PCI master device issues the first request again.

From the above discussion, it can be seen that: by using a data buffer with proper capacity, the present invention prefetches data requested by a PCI master device, and therefore reduces the read request frequency of the PCI master device. Moreover, by using a read request buffer, the present invention gathers up read requests of all PCI master device, and issues these read requests with a pipeline. Therefore, the occurrence of latency time is greatly reduced, and the efficiency of the PCI system is greatly increased.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 2:
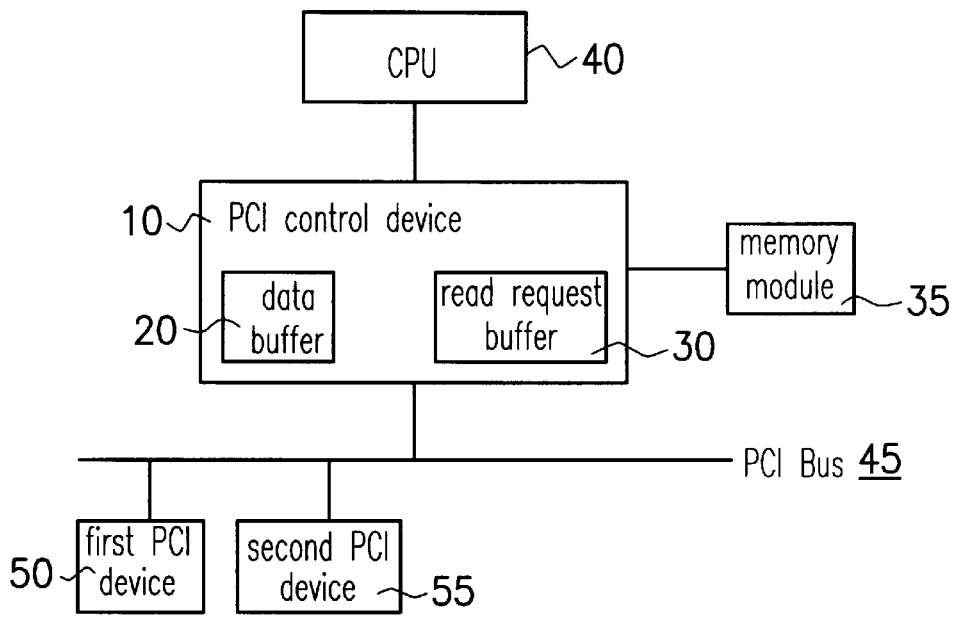
FIG. 2 is a block diagram showing a system according to one embodiment of the present invention.
Figure 3:
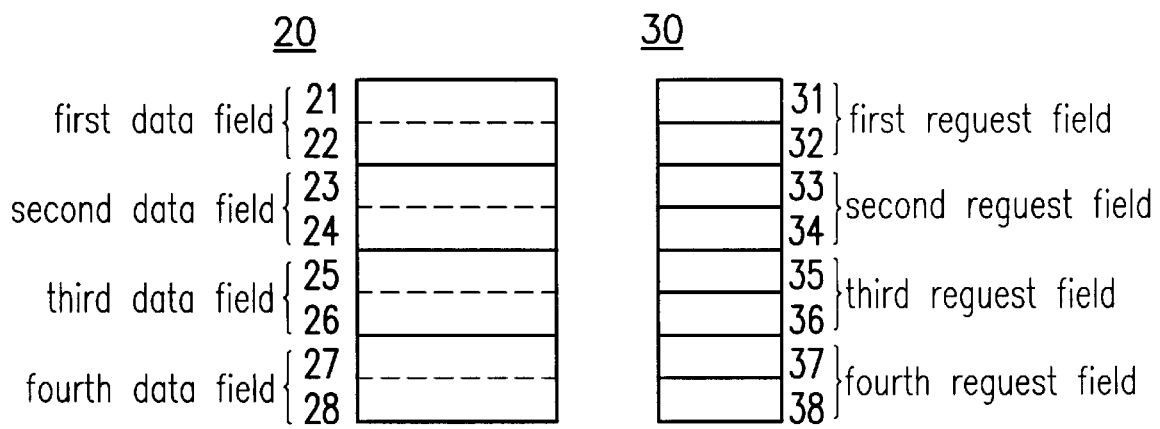
FIG. 3 is a block diagram showing the data buffer and read request buffer according to one embodiment of the present invention.

Reference is made to FIG. 2, which is a block diagram showing a system according to one embodiment of the present invention. The embodiment includes a PCI control device 10, a data buffer 20, a read request buffer 30, a memory module 35, a CPU 40, a PCI bus 45, a first PCI device 50 (a PCI master device) and a second PCI device 55 (another PCI master device). Reference is also made to FIG. 3, which is a block diagram showing one example of the data buffer 20 and the read request buffer 30 in FIG. 2 according to the invention. The data buffer 20 includes four data fields, and the read request buffer 30 includes four request fields. A first data field includes data buffer sections 21 and 22, a second data field includes data buffer sections 23 and 24, a third data field includes data buffer sections 25 and 26, and a fourth data field includes data buffer sections 27 and 28. Moreover, a first request field includes request buffer sections 31 and 32, a second request field includes request buffer sections 33 and 34, a third request field includes request buffer sections 35 and 36, and a fourth request field includes request buffer sections 37 and 38.

The capacity of each data buffer sections 21–28 is preferred to be 32 bytes. It is noted that each data buffer sections 21–28 is not limited to a capacity of 32 bytes, and moreover, the data buffer 20 is not limited to be divided into 8 buffers. Furthermore, because data are usually stored in the memory module 35, data reading efficiency in a PCI system is increased by prefetching data with continuous addresses. Thus, two request buffers are included in each of the four command buffers in this embodiment.

Moreover, the first parts of the four request fields, i.e., the request buffer sections 31, 33, 35 and 37, are adapted to store the data request initiated by the first PCI device 50 or the second PCI device 55. The second parts of the four request fields, i.e., the request buffer sections 32, 34, 36 and 38, are adapted to store the request prefetching the data next to the data which are requested by the first PCI device 50 or the second PCI device 55.

Furthermore, read data acquired by each of the four command buffers are stored in each of the four storage buffers when the read data are returned.

In this embodiment, each data field can store two-line data, i.e., 64 bytes. Moreover, the data length required for commands stored in each of the request buffers 31–38 is respectively the data length of the one-line data.

Next, the above-mentioned second read request is stored in any one of the four command buffers of the read request buffer 30 in this embodiment. Any one of the four storage buffers is designated to the PCI master device (for example: the first PCI device 50 or the second PCI device 55), which issues the first read request, under control of the PCI control device 10. Furthermore, since the read request buffer 30 consists of four command buffers in this embodiment, it is understood that four second read requests can be stored in the read request buffer 30. Meanwhile, the PCI control device 10 asks the first PCI device 50 (or the second PCI device 55) to retry. Then, corresponding to the result of the above-mentioned Snoop process, any one of the second read requests is issued to the CPU 40 or the memory module 35 under control of PCI control device 10 with pipeline.

However, the procedure of issuing any one of the second read requests with pipeline can be performed only in a condition that there is no data returned to the PCI control device 10. That is, once the level of the signal line PMRDY is asserted to a high level, the procedure of issuing the second read requests has to pause. Because the speed of either the CPU 40 or the memory module 35 is much faster than the speed of the PCI system, the PCI system has to wait for the end of data transaction of the read data after issuing about six second requests. After the data transaction of the read data is ended, the other second requests stored in the read request buffer 30 can be issued with pipeline.

Moreover, the read data are stored in one of the four storage buffers, which is designed to the PCI master device issuing the corresponding first read request, when the read data are returned from either the CPU 40 or the memory module 35. Then, under control of the PCI control device 10, the read data are transmitted to the corresponding PCI master device while the PCI master device retries.

Figure 4:
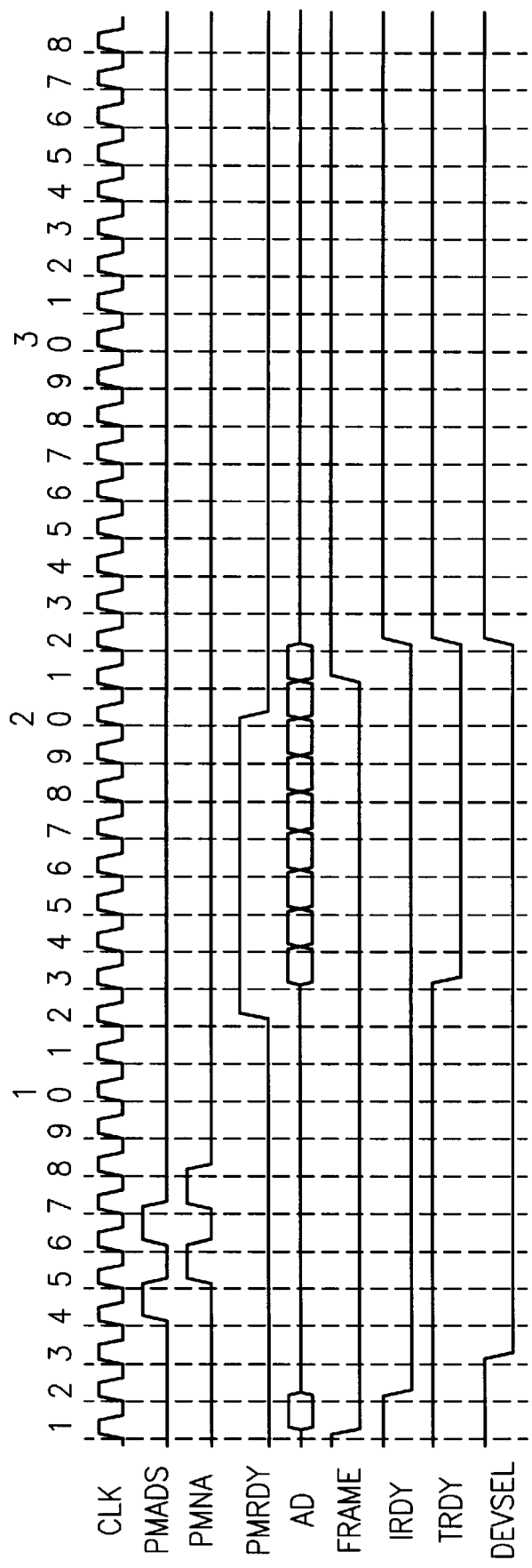
FIG. 4 is a timing diagram of the PCI system while processing the read request of the PCI master device according to one embodiment of the present invention.

Reference is now made to FIG. 4, which is a timing diagram of the PCI system while a read request of the PCI master device is processed according to one embodiment of the present invention. In FIG. 4, the signal PMADS is asserted to a high level when a PCI master device issues a request. The signal PMNA is asserted to a high level to indicate the PCI controller (or arbitrator) can accept a next address from the PCI master device. The signal PMRDY is asserted to a high level when the PCI master device is ready to access data. The starting addresses and data are put on the AD signal. The FRAME signal is asserted to a low level to indicate beginning of a transaction, and is deasserted to a high level in 1 clock cycle before the transaction ended. The signal IRDY is asserted to a low level by an initiator (for example, the PCI master device) to indicate that the initiator is ready to accept data. the signal TRDY is asserted to a low level by a target device (for example, the memory module) to indicate that the target device is ready to transmit data. The signal DEVSEL selects a device to be the target device in this transaction. The level of the signal line FRAME is asserted to a low level in the cycle CLK 1, and the address containing the read data is put on the data line AD. Because there is no other read request of the same or other PCI master device in this embodiment, the PCI control device 10 does not ask the PCI master device to retry, and the level of the signal line FRAME remains low to indicate that the PCI master device is waiting for the read data.

After that, the read requests stored in the read request buffer 30 are issued in order during cycle CLK 5. Before CLK 5, the first read request issued from the PCI master device is converted into the second read request mentioned above, the second read request is stored in the read request buffer 30, Snoop is performed, and a target device is selected for obtaining the read data. Attention should be paid to the data line PMADS and the signal line PMNA, in which the level of the data line PMADS is asserted to indicate issuance of the first part of the second read request which are, for example, the data stored in one of the request buffers 31, 33, 35 or 37. Next, the level of the signal line PMNA is asserted during cycle CLK 6 to indicate that the second part of the second read request can be issued, and the second part of the second read request is issued during cycle CLK 7. Moreover, the second part of the second read request is, for example, the data in one of the request buffers 32, 34, 36 or 38 according to where the second read request is actually stored. Then, the read data are ready for transmission to the PCI system during cycle CLK 12. Following the level of the signal line TRDY asserted during cycle CLK 13, a part of the read data are stored in the data buffer 20, and the PCI master device begins to read the read data during cycle CLK 13.

Figure 1:
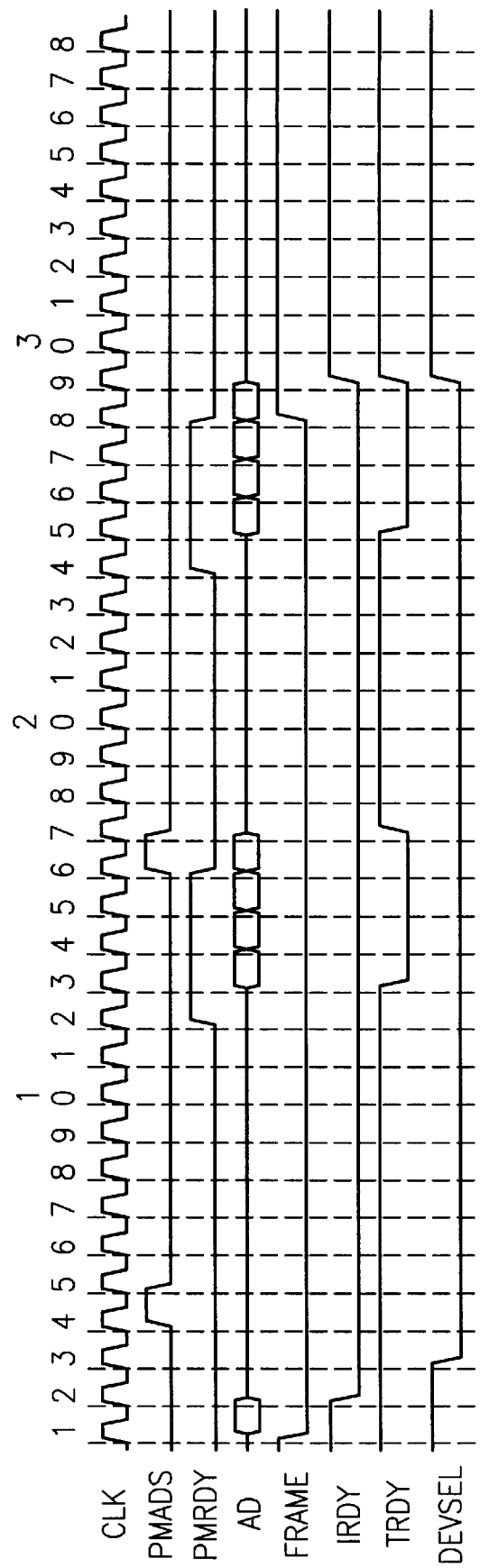
FIG. 1 is a timing diagram of the PCI system while processing the read request of the PCI device according to prior art.

It is noted that during the period between the cycle CLK 13 and the cycle CLK 21, 36 bytes of the read data are read by the PCI master device. Although the amount of data exceeds the limited data capacity of 32 bytes of any part of the four storage buffers described above (for example, any one of the buffers 21–28 in FIG. 3), the part of the data exceeding the limitation of 32 bytes does not result in an extra read request. Compared with FIG. 1, more data is transmitted even though the total amount of time is much shorter.

It is important that the accessing system is not limited to the devices described above. For example, the PCI control device can be an arbitrator on a bus. The memory module and the PCI master device are then a target device and an initiator in such an example, separately.

Figure 5:
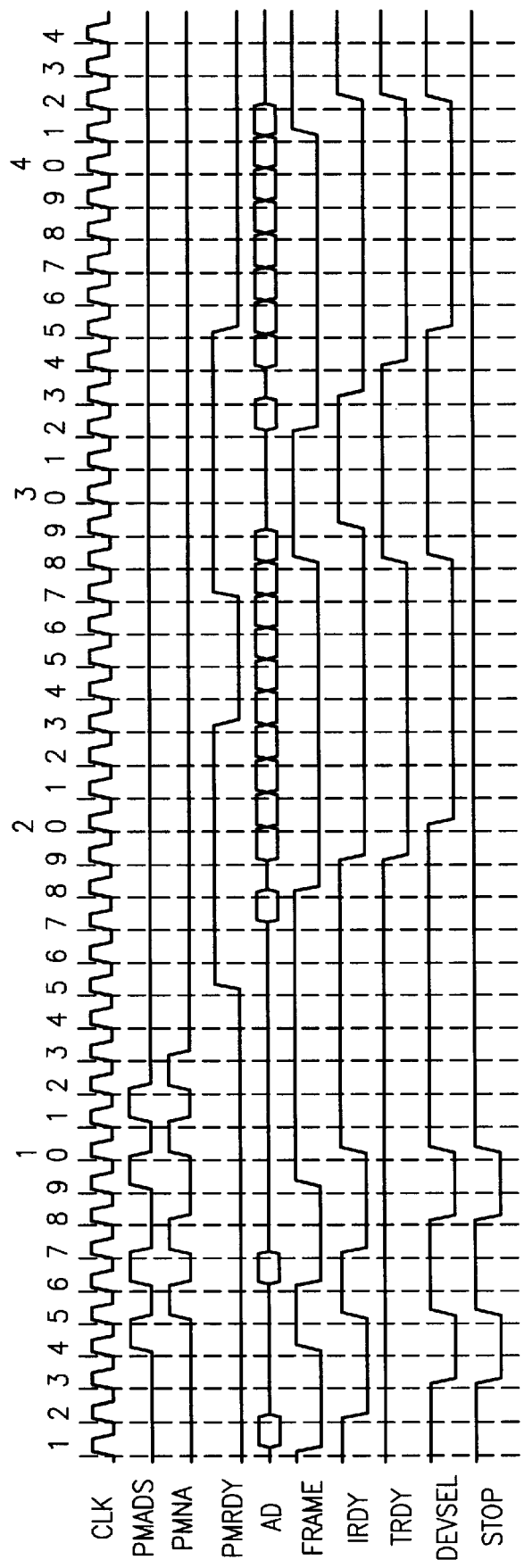
FIG. 5 is a timing diagram of the PCI system while processing the read requests of two PCI master devices according to another embodiment of the present invention.

Reference is now made to FIG. 5, which is a timing diagram of the PCI system while processing the read requests of two PCI master devices according to another embodiment of the present invention. The STOP signal is asserted to indicate that the PCI master device can transmit the next address, and the other signals are as described above in FIG. 4. This embodiment will now be discussed in more detail in combination with FIG. 2 and FIG. 3.

In FIG. 5, the PCI control device 10 issues the first part and the second part of the second read request, which, for example, is stored in the first command buffer, of the first PCI device 50 during cycle CLK 5 and CLK 7, separately. Next, the PCI control device 10 issues the first part and the second part of another second read request, which, for example, is stored in the second request buffer, of the second PCI device 55 during cycle CLK 10 and CLK 12, separately.

In fact, the PCI control device 10 asks the PCI master device, which issues the first read request, to wait or retry. In this embodiment, the PCI control device 10 asks the PCI master device (the first PCI device 50 and the second PCI device 55) to retry. Because of this, the PCI master devices do not receive the read data immediately when the read data are returned to the PCI system during cycle CLK 15 and CLK 27. The read data, which are returned to the PCI system, are stored in the data buffer 20 in the above-mentioned condition. Under control of the PCI control device 10, one of the four storage buffers is designated to the first PCI device 50, and the read data requested by the first PCI device 50 are stored in the corresponding storage buffer while being returned to the PCI system. In another aspect, one of the four storage buffers, except the one designated to the first PCI device 50, is designated to the second PCI device 55. The read data requested by the second PCI device 55 are thus stored in the corresponding storage buffer while being returned to the PCI system.

Next, the level of the signal line TRDY is asserted to indicate that the PCI masters are ready to accept data during cycle CLK 19 and CLK 34 after the PCI master devices retry, i.e., after the level of the signal line FRAME is asserted and the addresses in which the read data are contained is put on the data line AD during cycle CLK 17 and CLK 32, separately. And then, the read data are started to transmit to the PCI master devices during cycle CLK 19 and CLK 34, separately.

It is important to note that the present invention is not limited to the applications described herein although the above embodiments disclose only the applications of the multiple read requests of one PCI master device or of the single read request of a plurality of PCI master devices. The present invention can be adapted to multiple read requests from several PCI master devices, as well. Moreover, the capacities and the form of the storage of the read request buffer or the data buffer are not limited to the ones disclosed in the above embodiments.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A PCI data accessing system with a read request pipeline, comprising:

a PCI master device, issuing a first read request;

a memory module, storing data requested by the PCI master device; and a PCI control device, converting the first read request to a second read request, and storing the first and second read requests, the PCI control device comprising a read request buffer and a data buffer, wherein, data requested by the PCI master device are retrieved from the memory module, and the retrieved data are stored in the PCI control device before transferred to the PCI master device, and wherein, the read request buffer stores the second read request, and the second read request is transmitted by the PCI control device with the read request pipeline, and the data buffer includes a plurality of data fields, wherein one of the data fields is designated to the PCI master device when the first read request is issued, and data are stored in the designated data field when sent back from the memory module.

2. The PCI data accessing system of claim 1, wherein the read request buffer is a queue.

3. The PCI data accessing system of claim 1, wherein the read request buffer is able to store a plurality of the second read requests.

4. The PCI data accessing system of claim 1 further comprises a plurality of PCI master devices.

5. A data accessing system with a request pipeline, comprising:

an initiator, issuing a first request;

a target device, storing data requested by the initiator; and an arbitrator, converting the first request to a second request, and storing the first request, the second request and data retrieved from the target device, wherein the arbitrator comprising a request buffer and a data buffer, the request buffer stores the second request, and the second request is transmitted by the arbitrator with the request pipeline, and the data buffer includes a plurality of data fields, wherein one of the data fields is designated to the initiator when the first request is issued, and data are stored in the designated data field when sent back from the target device.

6. The data accessing system of claim 5, wherein the read request buffer is a queue.

7. The data accessing system of claim 5, wherein the read request buffer is able to store a plurality of the second read requests.

8. The data accessing system of claim 5 further comprises a plurality of initiators.

9. A method of using a data accessing system with a request pipeline, which is adapted to a computer system including an initiator and an arbitrator, comprising:

issuing at least two requests before data being retrieved;

converting a first read request into a second read request which includes the first read request;

dividing the second read request into a first part and a second part, and storing the first part and the second part in the arbitrator;

issuing the first part and the second part of the second read request in the request buffer with the pipeline;

transmitting data corresponding to the first part and the second part separately; and retrieving data requested by the requests continuously.

10. A PCI data accessing system with a read request pipeline, comprising:

a PCI master device, issuing a first read request;

a memory module, storing data requested by the PCI master device; and a PCI control device, converting the first read request to a second read request, and storing the first and second read requests, wherein data fetched by the second read request comprises at least data requested by the first read request, the PCI control device comprising a read request buffer and a data buffer, wherein, data requested by the PCI master device are retrieved from the memory module according to the second read request, and the retrieved data are stored in the PCI control device before transferred to the PCI master device, and wherein, the read request buffer stores the second read request, and the second read request is transmitted by the PCI control device with the read request pipeline, and the data buffer includes a plurality of data fields, wherein one of the data fields is designated to the PCI master device when the first read request is issued, and data are stored in the designated data field when sent back from the memory module.

* * * * *